US008553559B2

(12) United States Patent
Birk et al.

(10) Patent No.: US 8,553,559 B2
(45) Date of Patent: *Oct. 8, 2013

(54) METHODS AND APPARATUS TO MANAGE BYPASS PATHS IN AN INTERNET PROTOCOL (IP) NETWORK

(75) Inventors: Martin Birk, Holmdel, NJ (US); Maria Napierala, Ocean, NJ (US); Kathleen Tse, Holmdel, NJ (US); Simon Zellingher, Morganville, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,117

(22) Filed: Jul. 19, 2012

(65) Prior Publication Data

US 2012/0281538 A1  Nov. 8, 2012

Related U.S. Application Data

(63) Continuation of application No. 12/558,200, filed on Sep. 11, 2009, now Pat. No. 8,248,951.

(51) Int. Cl.
*H04J 1/00* (2006.01)

(52) U.S. Cl.
USPC .......................................................... 370/237

(58) Field of Classification Search
USPC ......... 370/217–225, 235, 237, 236, 351–356, 370/389, 396, 395.5, 395.52, 400–401
See application file for complete search history.

(56) References Cited

U.S. PATENT DOCUMENTS

| | | | |
|---|---|---|---|
| 5,892,924 A * | 4/1999 | Lyon et al. ................. 709/245 |
| 5,898,673 A | 4/1999 | Riggan et al. |
| 5,903,559 A | 5/1999 | Acharya et al. |
| 5,991,292 A | 11/1999 | Focsaneanu et al. |
| 6,154,445 A | 11/2000 | Farris et al. |
| 6,256,314 B1 | 7/2001 | Rodrig et al. |
| 6,574,216 B1 | 6/2003 | Farris et al. |
| 7,117,269 B2 * | 10/2006 | Lu et al. ..................... 709/238 |
| 7,389,018 B1 | 6/2008 | Birk et al. |
| 7,446,932 B2 | 11/2008 | Zhou et al. |
| 7,466,919 B1 | 12/2008 | Birk et al. |
| 7,493,410 B2 | 2/2009 | Moore et al. |
| 7,586,899 B1 | 9/2009 | Mohaban et al. |
| 8,248,951 B2 | 8/2012 | Birk et al. |
| 2007/0291351 A1 | 12/2007 | Zhou et al. |
| 2008/0247034 A1 | 10/2008 | Zhou et al. |
| 2011/0063976 A1 | 3/2011 | Birk et al. |

OTHER PUBLICATIONS

Grolmusz et al., "Secure Routerless Routing," Extended Abstract, 2004, 7 pages.

(Continued)

*Primary Examiner* — Frank Duong
(74) *Attorney, Agent, or Firm* — Hanley, Flight & Zimmerman, LLC

(57) ABSTRACT

Methods and apparatus to manage bypass paths in an Internet protocol (IP) network are disclosed. An example method disclosed herein includes identifying an aggregation router source bandwidth to a first Internet protocol router exceeding a source threshold value, identifying a first value of the aggregation router bandwidth directed to a first destination, identifying a second value of the aggregation router bandwidth directed to a plurality of second destinations, and bypassing the Internet protocol router with a Layer-2 Open systems Interconnection Reference device via a routerless bypass path when the first value of the aggregation router bandwidth exceeds a first threshold value.

20 Claims, 8 Drawing Sheets

(56) References Cited

OTHER PUBLICATIONS

"Video Stream International, Inc. Names MicroNet Technology as a Partner in Development of Breakthrough Routerless Network Technology," www.thefreelibrary.com, Business Wire, Aug. 7, 1998, 3 pages.

Shinder, Deb, "Understanding Routing Tables," May 23, 2001, 5 pages.

Razavi, Roozbeh, "How Routing Algorithms Work," http://computer.howstuffworks.com/routing-algorithm.htm., retrieved Jul. 15, 2009, 8 pages.

Cisco Systems Inc., "Cisco Carrier Routing System," brochure, Jun. 2009, 11 pages.

Tulloch, Mitch, "TCP/IP Troubleshooting: A Structured Approach—Part 2: Troubleshooting Routing Tables," Oct. 17, 2006, 10 pages.

Akinlar, C., "IP Address Configuration Algorithms for Routerless and Single-Router Zeroconf Networks," IEEE Xplore, 2002, 1 page.

Frnaklin, Curtis, "How Routers Work," http://www.howstuffworks.com/router.htm/printable, retrieved Jun. 18, 2009, 7 pages.

Cisco Systems, Inc., "Deploying Control Plane Policing," white paper, 2005, 19 pages.

United States Patent and Trademark Office, "Notice of Allowance," issued in connection with U.S. Appl. No. 12/558,200, mailed Apr. 20, 2012, 15 pages.

United States Patent and Trademark Office, "Non-Final Office Action," issued in connection with U.S. Appl. No. 12/558,200, mailed Aug. 31, 2011, 23 pages.

* cited by examiner

| SRC. | DEST. | NODE CAPACITY | ROUTER BYPASS THRES. | TRAFFIC DESTINATION % | DESTINATION THRESHOLD | FIRST CANDIDATE | SECOND CANDIDATE | THIRD CANDIDATE |
|---|---|---|---|---|---|---|---|---|
| A | B | 40 Gbit/s | 35 Gbit/s | 10% | 20% | n/a | n/a | n/a |
| A | C | 40 Gbit/s | 35 Gbit/s | 30% | 25% | A-C | A-B-C | A-F-C |
| A | D | 40 Gbit/s | 35 Gbit/s | 5% | 15% | n/a | n/a | n/a |
| A | E | 40 Gbit/s | 35 Gbit/s | 40% | 30% | A-F-E | A-C-E | A-B-C-E |
| A | F | 40 Gbit/s | 35 Gbit/s | 10% | 20% | n/a | n/a | n/a |
| B | A | 35 Gbit/s | ... | | | | | |
| B | C | 35 Gbit/s | | | | | | |
| ... | | | | | | | | |

FIG. 3

METHODS AND APPARATUS TO MANAGE BYPASS PATHS IN AN INTERNET PROTOCOL (IP) NETWORK

CROSS REFERENCE TO RELATED APPLICATION

This patent is a continuation of and claims priority to U.S. application Ser. No. 12/558,200, filed Sep. 11, 2009, entitled "Methods and Apparatus to Manage Bypass Paths in an Internet Protocol (IP) Network," which is hereby incorporated herein by reference in its entirety.

FIELD OF THE DISCLOSURE

This disclosure relates generally to network communication and, more particularly, to methods and apparatus to manage bypass paths in an Internet protocol (IP) network.

BACKGROUND

As an increasing number of packets traverse an IP network, routers in nodes of the network eventually reach a bandwidth capacity limit. Typical responses by network administrators when one or more routers reach such a bandwidth capacity limit include adding additional routers at the nodes having the overburdened routers. The routers employed in network nodes are typically Layer-3 devices to accommodate source-to-destination delivery of packet traffic over a Network Layer defined by the Open systems Interconnection Reference (OSI) model. The OSI model specifies eight layers, each having functionality that may facilitate further capabilities of one or more adjacent layers. The Physical Layer is the lowest layer of the OSI model (Layer-1), and defines physical and/or electrical specifications for devices. Higher levels of the OSI model include a greater degree of complexity with regard to data, addressing, reliability, and/or encryption.

Addition of one or more Layer-3 routers typically includes substantial increases in capital costs, power supply requirements, physical space requirements, and/or router environmental controls (e.g., air-conditioning). For example, some 4-slot Layer-3 routers include chassis power supplies having a capacity of 4000 watts, while larger 8-slot Layer-3 routers may have 7500 watt power supplies. Thus, adding one or more Layer-3 routers may result in significant energy and/or installation costs.

BRIEF DESCRIPTION OF THE DRAWINGS

FIG. 3 is an example router table that may be implemented by the example path manager of FIGS. 1 and 2.

DETAILED DESCRIPTION

Methods and apparatus to manage an Internet protocol (IP) network are disclosed herein. An example method includes receiving IP traffic at an aggregation router, and measuring a bandwidth value of the IP traffic forwarded from the aggregation router to an IP router at a starting node. The example method also includes establishing a first non-routed bypass path between a switch at the starting node and a first switch at a first destination node when a measured traffic throughput value of the IP router at the starting node exceeds a first threshold value, and sending the IP traffic from the aggregation router via the bypass path.

In the event that a network administrator decides to add one or more Layer-3 (e.g., the Network Layer (Layer-3) as defined by the Open systems Interconnection Reference (OSI) model) routers to a network node in response to bandwidth limitations of existing routers at the node, the network administrator must also typically expend substantial capital to purchase the router, procure a location for the router, provide substantial amounts of power for the router, and/or consider proper environmental controls for the router in view of relatively large power consumption and dissipation requirements. Power consumption requirements for relatively small Layer-3 routers (e.g., 4-slot routers) may reach 4000 watts and generate over 16,000 BTU/hour. Requirements for such power are the result of, in part, processing requirements for the network packet traffic. Control of network packets at Layer-3 of the OSI model requires more processing resources than control of those same network packets using a device operating in conformance with a lower layer of the OSI model (e.g., a switch). As such, network packets traversing a device operating in compliance with lower levels of the OSI model have lower power requirements, smaller size requirements, and/or dissipate lower amounts of energy heat ash.

The methods and apparatus described herein facilitate, in part, accommodating increased packet network traffic at a network node while reducing capital investment, power requirements, and/or heat-dissipation associated with source-to-destination control of network packet traffic. As described in further detail below, employing one or more OSI devices that operate at levels below Layer-3 typically results in a corresponding cost reduction in terms of capital investment, infrastructure preparation (e.g., air conditioning), and/or space requirements. Generally speaking, as the processing (e.g., packet flow control, packet fragmentation, packet reassembly, etc.) applied to a network packet by a device increases, a corresponding cost associated with such a device and processing also increases.

Figure 1:
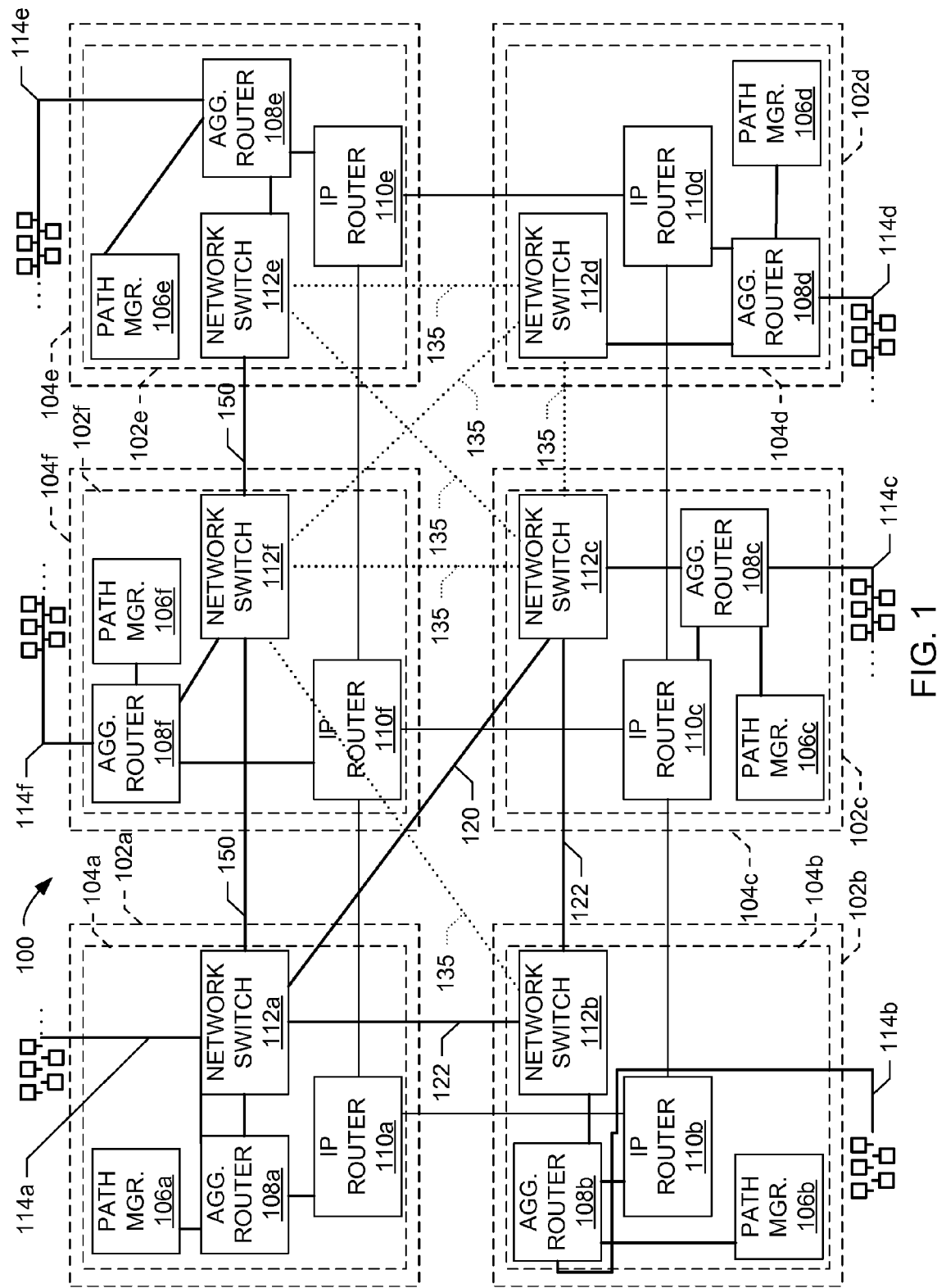
FIG. 1 is a schematic illustration of an example Internet protocol (IP) network constructed in accordance with the teachings of this disclosure.

FIG. 1 illustrates an example Internet protocol (IP) network 100. In the illustrated example of FIG. 1, a first central office (CO) (CO-a) 102a includes a path unit 104a. As described in further detail below, the path unit 104a includes elements to facilitate the methods and apparatus to manage bypass paths in the IP network 100. The example IP network 100 also includes CO-b 102b, CO-c 102c, CO-d 102d, CO-e 102e, and CO-f 102f, in which each CO includes a corresponding path unit (104b through 104f, respectively). Generally speaking, a CO is a geographic location or node for the IP network 100 that facilitates one or more network services for a region (e.g., a neighborhood, a corporate business park, a network load, etc.). While each example CO 102a-f may include any number of additional and/or alternate network elements, each corresponding CO 102a-f includes a path unit 104a-f to facilitate bypass paths in the IP network 100.

Each path unit 104a-f includes a path manager 106a-f, an aggregation router 108a-f, an IP router 110a-f, and a network switch 112a-f. Each of the example aggregation routers 108a-f is communicatively connected to a network load 114a-f, which may include any number of households and/or businesses utilizing network services provided by the corresponding CO 102a-f. Additionally, each of the example aggregation routers 108a-f is communicatively connected to each respective path manager 106a-f, each respective IP router 110a-f, and each respective network switch 112a-f. As described in further detail below, the example path managers 106a-f monitor one or more operating parameters of the COs 102a-f to determine when to implement the network switches 112a-f in a manner that does not require processing by the corresponding IP routers 110a-f. To that end, the previously overburdened IP routers 110a-f are relieved of some network traffic via one or more routerless bypass paths, thereby delaying and/or eliminating a need for the network administrator to purchase additional IP routers to ease the burden on one or more existing IP routers 110a-f within the example IP network 100.

While for ease of discussion the example IP network 100 includes six (6) COs (i.e., CO-a through CO-f), any number of COs may be employed to manage bypass paths in an IP network. In the illustrated example of FIG. 1, each CO is communicatively directly connected to two other COs via its corresponding IP router 110a-f in a fully connected topology, but the topological layout of FIG. 1 is for purposes of description and not limitation. That is, the methods and apparatus to manage bypass paths in an IP network described herein may operate with any number of network nodes (e.g., COs) in any topological configuration (e.g., a fully connected network, a star network, a ring network, a mesh network, a line network, a tree network, etc.).

In the event that a network load, such as the example network load 114a, generates and/or receives an amount of network traffic that exceeds an ability of the example IP router 110a to process, the network administrator may consider adding another IP router (e.g., an OSI Layer-3 router) to the example CO 102a. Additionally or alternatively, the network administrator may add another IP router even when network traffic does not exceed the ability of the example IP router 110A. For example, the network administrator may add one or more additional IP router(s) in anticipation of network demand and/or in response to observed network utilization between two or more network nodes. As described above, while adding additional IP routers may accommodate added bandwidth demands caused by the example network load 114a, such addition of IP routers also may result in significant cost increases and/or significant power demands. By contrast, the systems and techniques described herein accommodate those additional bandwidth demands without necessarily requiring the acquisition and installation of additional IP routers.

In an effort to accommodate added bandwidth demands of the network load 114a-f, the example IP network 100 employs one or more of the network switches 112a-f to establish a network bypass path between two or more path units 104a-f, which eliminates the need for the traffic on that network bypass path to be handled by routers. For example, in the event that the example path manager 106a determines that network traffic from CO-a 102a to CO-c 102c reaches a threshold throughput (e.g., measured in bits per second (bit/s), kilobits per second (Kbit/s), megabits per second (Mbit/s), gigabits per second (Gbit/s), terabits per second (Tbit/s), etc.), the example path manager 106a may direct the example aggregation router 108a to route traffic that is directed to CO-c 102c via the example network switch 112a over a first bypass path 120 to the example network switch 112C, thereby relieving the IP router 110a of that traffic burden. Without limitation, if the first bypass path 120 is not functioning, is already inundated with excessive traffic, or does not exist, then the example path manager 106a may initiate a second bypass path 122 that employs network switch 112b to ultimately reach network switch 112c via 102b. In effect, example CO-b 102b cooperates with CO-a 102a to facilitate the routerless bypass path 122 from CO-a 102a to CO-c 102c.

Candidate network switch connections that are not established 135 are illustrated by dotted lines. In the event that one or more connections between existing network switches 112 are needed, the methods and apparatus described herein may establish or provision (i.e., activate and/or otherwise enable) one or more routerless bypass paths using the candidate network switch connections 135. On the other hand, in the event that one or more connections between existing network switches 112 are no longer needed, such network switches 112 may be relinquished and/or otherwise made available for future use. For example, if the example path manager 106 measures a bandwidth threshold and determines that demand has dropped to a level that a corresponding router can accommodate, then the network switch 112 may be deactivated in favor of the IP router 110. In some examples, the bandwidth measurements may be made for a threshold period of time to verify that network traffic demands have dropped.

While an example manner of implementing the example IP network 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example path units 104a-f, the example path managers 106a-f, the example aggregation routers 108a-f, the example IP routers 110a-f, and the example network switches 112a-f of FIG. 1 may be implemented by hardware, software, firmware and/or any combination of hardware, software and/or firmware. Thus, for example, any of the example path units 104a-f, the example path managers 106a-f, the example aggregation routers 108a-f, the example IP routers 110a-f, and the example network switches 112a-f may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, an IP network 100 may include interfaces, data structures, elements, processes and/or devices instead of, or in addition to those illustrated in FIG. 1 and/or may include more than one of any or all of the illustrated interfaces, data structures, elements, processes and/or devices. When any of the appended claims are read to cover a purely software and/or firmware implementation, at least one of the example path units 104a-f, the example path managers 106a-f, the example aggregation routers 108a-f, the example IP routers 110a-f and/or the example network switches 112a-f are hereby expressly defined to include a tangible medium such as a memory, digital versatile disk (DVD), compact disk (CD), etc., storing such software and/or firmware.

Figure 2:
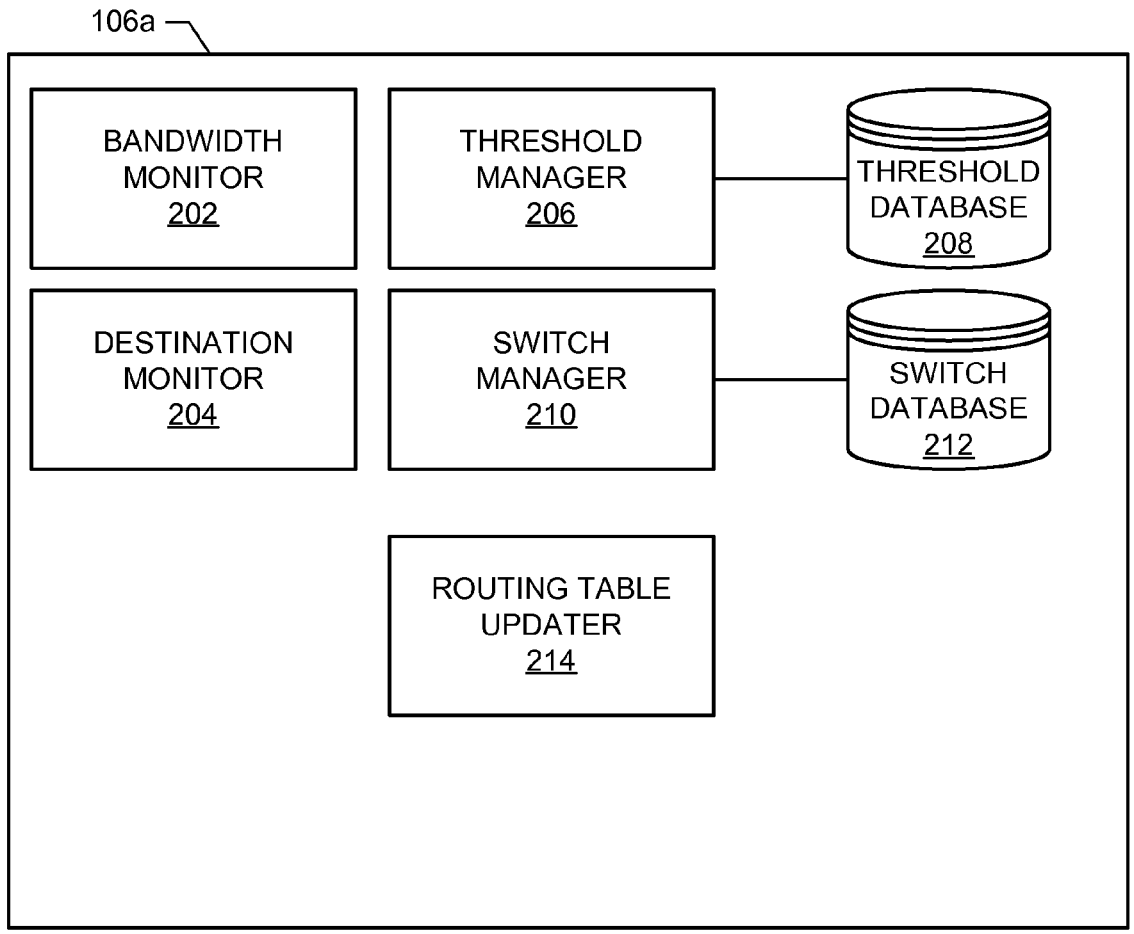
FIG. 2 is a block diagram of an example path manager that may be implemented by the example IP network of FIG. 1.

FIG. 2 illustrates an example manner of implementing the example path manager 106a-f of FIG. 1. As described above, each example CO (e.g., CO-a through CO-f) includes an associated path manager 106a-f. For purposes of illustration, and not limitation, FIG. 2 will be described from a point of view of path manager 106a within CO-a. To monitor the bandwidth throughput for an IP router, such as the example IP router 110a of FIG. 1, the example path manager 106a includes an example bandwidth monitor 202. Moreover, to further determine a destination of packets through of the IP router, the example path manager 106a includes a destination monitor 204. In operation, the example bandwidth monitor 202 measures one or more throughput values (e.g., in Gbits/s) of a corresponding IP router (e.g., the example IP router 110a of FIG. 1) and the example destination monitor 204 identifies one or more destination(s) of the network traffic. For example, the destination monitor 204 may generate a histogram of packet traffic destinations (e.g., CO-b, CO-c, etc.) and identify a corresponding throughput value associated with each destination to illustrate which of the destinations is receiving the greatest amount of network traffic from the IP router (e.g., 110a). In other examples, the destination monitor 204 may generate packet traffic table(s) stored in a memory that compare the corresponding throughput value associated with each destination to identify which of the destinations is receiving the greatest amount of network traffic from the IP router. One or more mathematical comparisons may be performed on the packet traffic table(s) to ascertain destinations receiving the greatest amount of network traffic. In some examples, to minimize processing needs of the example path manager 106a, the example destination monitor 204 may refrain from operating until after a threshold throughput level is identified at the IP router 110a, which may be determined by the example threshold manager 206 of FIG. 2.

In view of the fact that each separate CO 102a-f may include network elements (e.g., IP routers, aggregation routers, etc.) having varying capabilities (e.g., 20 Gig routers vs. 40 Gig routers, etc.), the threshold manager 206 of CO-a 102a may query a threshold database 208 to determine appropriate threshold value settings for each CO and/or path unit. If the example threshold manager 206 compares a throughput value of an IP router (as determined by the example bandwidth monitor 202) against a threshold throughput value identified in the threshold database 208 and determines that the threshold value of throughput has been exceeded, then the example destination monitor 204 is invoked to determine what portion of the network traffic is going to any particular CO. As described above, the example destination monitor 204 may generate a histogram and/or table to identify which CO (e.g., CO-a through CO-f) is receiving the most amount of network traffic, thereby identifying the best candidate for which to implement a routerless bypass path. In the event that the example destination monitor 204 identifies that a relatively large percentage of the measured throughput is associated with, for example, CO-c 102c, then an example switch manager 210 of CO-a 102a queries a switch database 212 to determine whether CO-c 102c has a corresponding path unit (i.e., a path unit that includes a network switch to which the network traffic can be sent). If so, then an example routing table updater 214 updates a routing table associated with the example aggregation router 108a so that all network traffic from the load 114a that is intended for CO-c 102c traverses via a routerless bypass path, such as the first path 120 or the second path 122. This routerless path is facilitated by switches rather than routers, therefore IP network bandwidth demands are satisfied in a cost judicious manner and power demands are minimized. As a result, the network traffic sent from the load 114a that is directed to CO-c 102c no longer gets routed via the IP router 110a, thereby relieving processing requirements of the IP router 110a.

While an example manner of implementing the example path managers 106a-f of FIG. 1 has been illustrated in FIG. 2, one or more of the elements, processes and/or devices illustrated in FIG. 2 may be combined, divided, re-arranged, omitted, eliminated and/or implemented in any other way. Further, the example bandwidth monitor 202, the example destination monitor 204, the example threshold manager 206, the example threshold database 208, the example switch manager 210, the example switch database and/or the example routing table updater 214 of FIG. 2 may be implemented by hardware, software, firmware and/or any combination of hardware, software, firmware and/or firmware. Thus, for example, any or all of the example bandwidth monitor 202, the example destination monitor 204, the example threshold manager 206, the example threshold database 208, the example switch manager 210, the example switch database and/or the example routing table updater 214 may be implemented by one or more device(s), circuit(s), programmable processor(s), ASIC(s), PLD(s) and/or FPLD(s), etc. Further still, the path manager 106a-f may include one or more elements, processes and/or devices in addition to, or instead of, those illustrated in FIG. 2, and/or may include more than one of any or all of the illustrated elements, processes and devices. When any of the appended claims are read to cover a purely software and/or firmware implementation, at least one of the example bandwidth monitor 202, the example destination monitor 204, the example threshold manager 206, the example threshold database 208, the example switch manager 210, the example switch database and/or the example routing table updater 214 are hereby expressly defined to include a tangible medium such as a memory, DVD, CD, etc., storing such software and/or firmware.

FIG. 3 illustrates an example routing table 300 generated, maintained and/or updated by the example routing table updater 214 of FIG. 2. In the illustrated example of FIG. 3, the routing table 300 includes a node column 302 and a destination column 304 to identify a source node (e.g., a source CO of network traffic generated by an associated network load) of network traffic and a corresponding destination node (e.g., a destination CO) to which the network traffic is directed. Additionally, the example routing table 300 includes a node IP router capacity column 306 to identify a throughput measurement value of the IP router, and an IP router bypass threshold column 308 to identify a threshold throughput value that, when exceeded, invokes the example destination monitor 204 to determine what portion of the network traffic is directed to any particular destination CO, if any. For example, while a condition of excessive throughput for the IP router can be minimized and/or eliminated by establishing a routerless bypass path (e.g., a point-to-point path), such benefits are typically realized when one of the destination paths accounts for a substantial amount (e.g., 20% of the total network traffic handled by an IP router) of the measured throughput. In the event that one of the destination paths does not comprise a substantial amount of the measured network traffic (e.g., the IP router is handling routing for numerous and/or disparate destinations), then establishing a routerless bypass path may not alleviate network traffic demands imposed upon the IP router. In that case, adding another IP router may be justified because, for example, the network traffic is not focused and/or consolidated to any one destination to a substantial degree (e.g., 20% of the network traffic processed by the IP router routed to a specific CO).

The example routing table 300 of FIG. 3 also includes a traffic destination percentage column 310 to identify a percentage value of network traffic handled by the IP router from the source node (e.g., column 302) to the destination node (e.g., column 304), and a corresponding threshold percentage column 312 to identify a requisite percentage of the IP router throughput that must be surpassed before the example path manager 106a-f establishes a routerless bypass path from one path unit to another path unit. If a value in the example traffic destination percentage column 310 exceeds a threshold value in the threshold percentage column 312, then the example threshold manager 206 identifies one or more candidate switches within the IP network 100 that can be activated to facilitate a routerless bypass path. Candidate switches are listed in rank-order 313 and identified in the example table 300 by a first candidate column 314, a second candidate column 316, and a third candidate column 318. To select one of the candidate switches, the example threshold manager 206 invokes the switch manager 210 to determine utilization information for each of the candidate switches. For example, the switch manager 210 may query each of the available network switches 112a-f on a manual, periodic, aperiodic, and/or scheduled basis to determine a utilization value (e.g., a traffic throughput value as measured in Gbit/s). Network switches that are already burdened with network traffic, such as from a previously established routerless bypass path, are not considered as candidates when establishing a new/alternate routerless bypass path. On the other hand, network switches that are not burdened with network traffic and/or have a greater amount of available bandwidth are ranked in a higher order in the rank-order list 313.

In the illustrated example of FIG. 3, row 320 identifies that the traffic destination percentage 310 from node A to node C is 5% over the destination threshold value 312 (i.e., the traffic destination is 30% and the corresponding threshold is 25%). In operation, the example threshold manager 206 ranks switch A-C 322 as the first candidate 314 because network switch A 112a and network switch C 112c are the least burdened switches that can accommodate network traffic between nodes A and C. On the other hand, the example third candidate 318 switch path A-F-C is ranked third because, for example, network switch F 112f is utilized to a greater relative degree when compared to one or more alternate network switch combinations that can send network traffic from node A to node C (via any number of intermediate node(s)).

Figure 4:
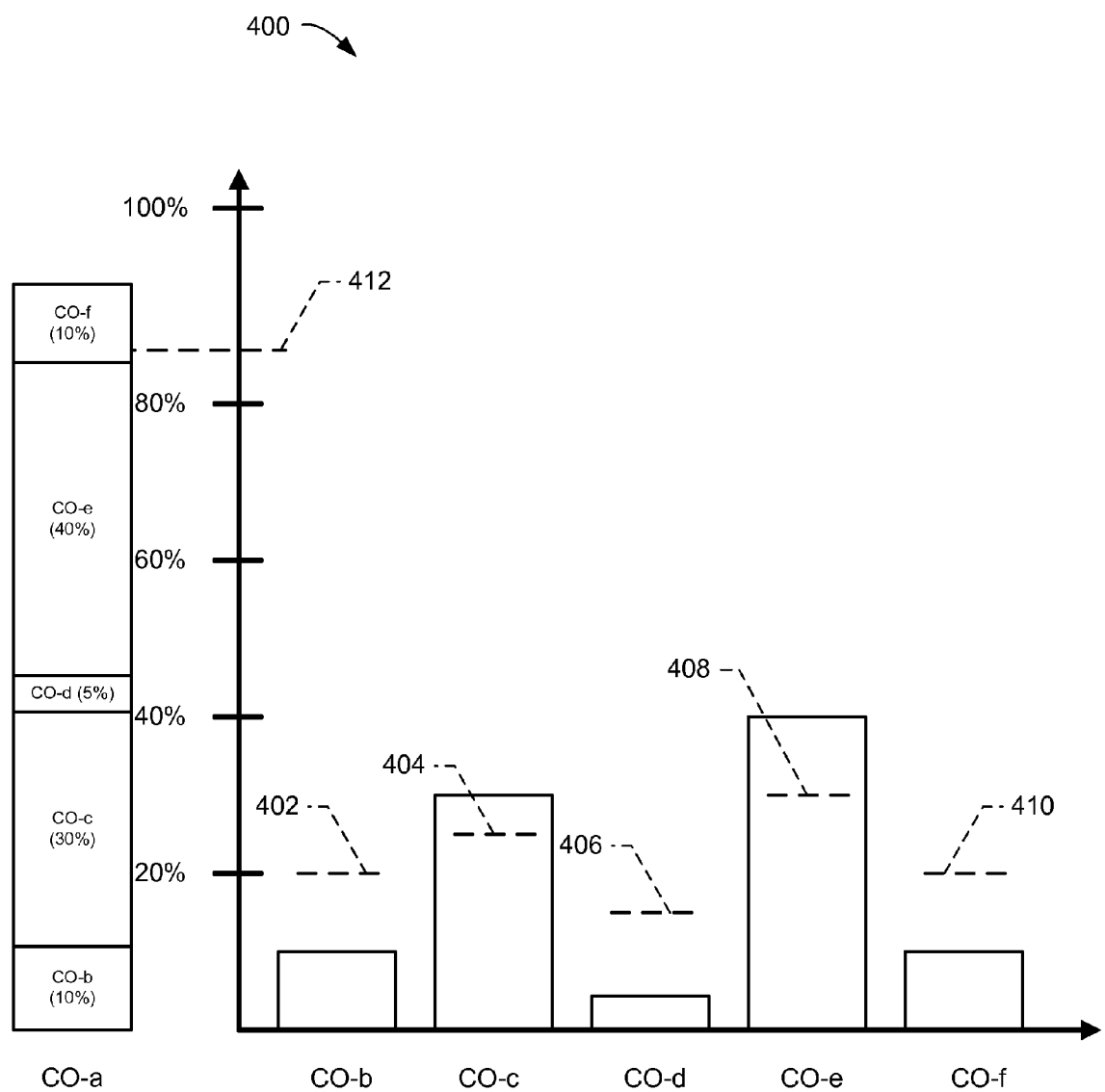
FIG. 4 is an example histogram that may be generated by the example path manager of FIGS. 1 and 2 in accordance with the teachings of this disclosure.

The utilization information generated by the example switch manager 210 may be represented by the example histogram 400 as shown in FIG. 4. As described above, the example switch manager 210 may, additionally or alternatively, generate a table on which mathematical operations may be performed to identify circumstances in which one or more thresholds are exceeded. For purposes of explanation, and not limitation, FIG. 4 represents one or more thresholds and whether or not they have been exceeded by way of a histogram. In the illustrated example of FIG. 4, the histogram 400 illustrates utilization information associated with network traffic originating from IP router 110a (at CO-a 102a) and arriving at IP router 110b (at CO-b 102b), IP router 110c (at CO-c 102c), IP router 110d (at CO-d 102d), IP router 110e (at CO-e 102e), and IP router 110f (at CO-f 102f). The example histogram 400 includes a destination threshold 402 of 20% for CO-b, a destination threshold 404 of 25% for CO-c, a destination threshold 406 of 15% for CO-d, a destination threshold 408 of 30% for CO-e, and a destination threshold 410 of 20% for CO-f. Accordingly, CO-a operates at 95% of its capacity, which is 10% above an operating threshold 412 in which a network manager would consider adding additional routing resource(s). Destination threshold percentage values shown in FIG. 4 are selected for purposes of discussion and not limitation, and such destination threshold percentage values may be set to be any value based on, for example, known functional limits of one or more network switches 112a-f residing within an example path unit of the example IP network 100.

The example histogram 400 of FIG. 4 illustrates that two of five COs exceed destination threshold values. In particular, CO-c and CO-e receive network traffic in excess of 25% and 30%, respectively. As such, the example threshold manager 206 of FIG. 2 selects network switch candidates to invoke that establish a routerless bypass path between (1) CO-a 102a and CO-c 102c, and (2) a routerless bypass path between CO-a 102a and CO-e 102e. In the event that network switch 112a and network switch 112c have capacity to carry network traffic (as determined by the example switch manager 210), then the example threshold manager 206 may select those switches to enable the bypass, as indicated in the example first candidate column 314 of the example table 300 of FIG. 3. Similarly, in the event that network switch 112a, network switch 112f, and network switch 112e have capacity to carry network traffic, then the example threshold manager 206 may select those switches to enable the bypass, as indicated in the example first candidate column 314 of the example table 300 of FIG. 3. Although the routerless bypass path between CO-a and CO-e could also be facilitated by way of a path from network switch 112a, then to network switch 112c, and finally to network switch 112e, the example threshold manager 206 may decide to avoid directing additional network traffic via network switch 112c because it is already facilitating the routerless path between CO-a and CO-c.

To illustrate the example routerless bypass paths established in view of the example histogram 400 of FIG. 4, the illustrated example of FIG. 1 includes the routerless bypass path 120 between network switch 112a and network switch 112c. As a result, the network traffic that was previously processed by the example IP router 110a in CO-a is now forwarded to CO-c by way of network switches 112a and 112c, thereby reducing network traffic processing burdens from both IP router 110a and IP router 110c. Similarly, the illustrated example of FIG. 1 includes a routerless bypass path 150 between network switch 112a and network switch 112e, which employs intermediate network switch 112f because no direct link exists between CO-a and CO-e. As a result, the network traffic that was previously processed by the example IP router 110a in CO-a is now forwarded to CO-e by way of network switches 112a, 112f, and 112e, thereby reducing network traffic processing burdens from IP routers 110a, 110f, and 110e.

Figure 5A:
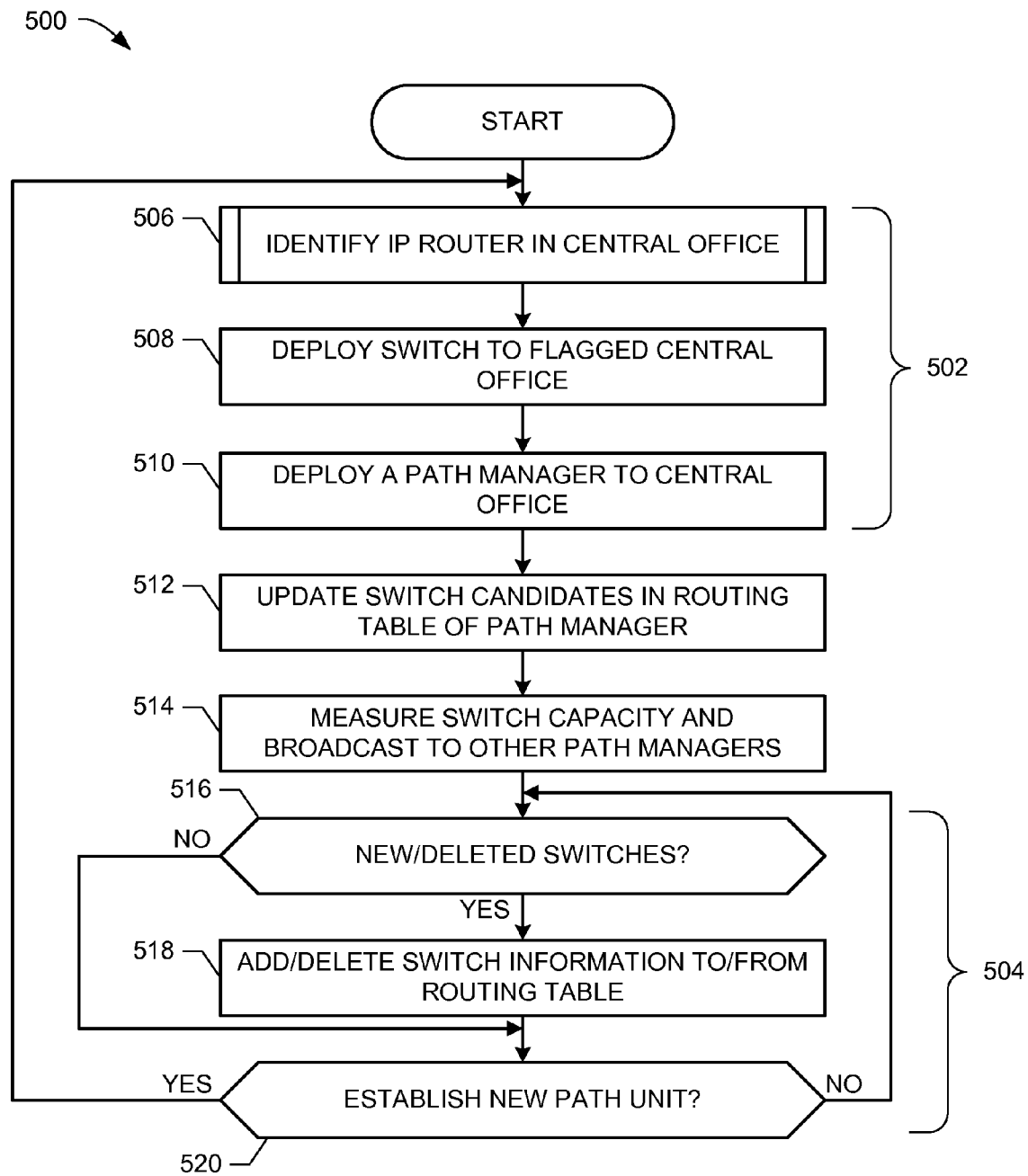
FIGS. 5A, 5B and 6 are example processes that may be carried out to implement the example IP network of FIG. 1.
Figure 5B:
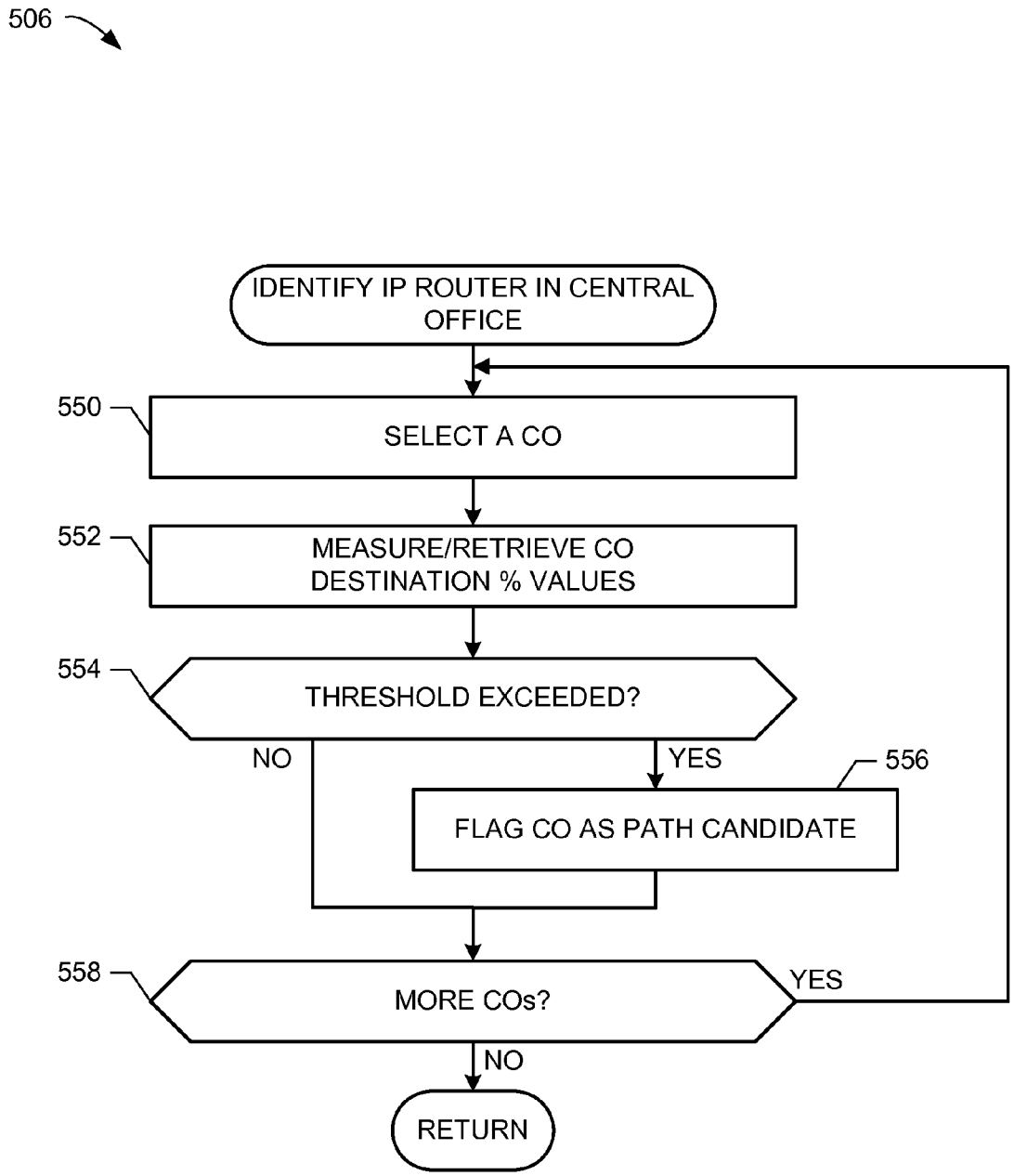
Figure 6:
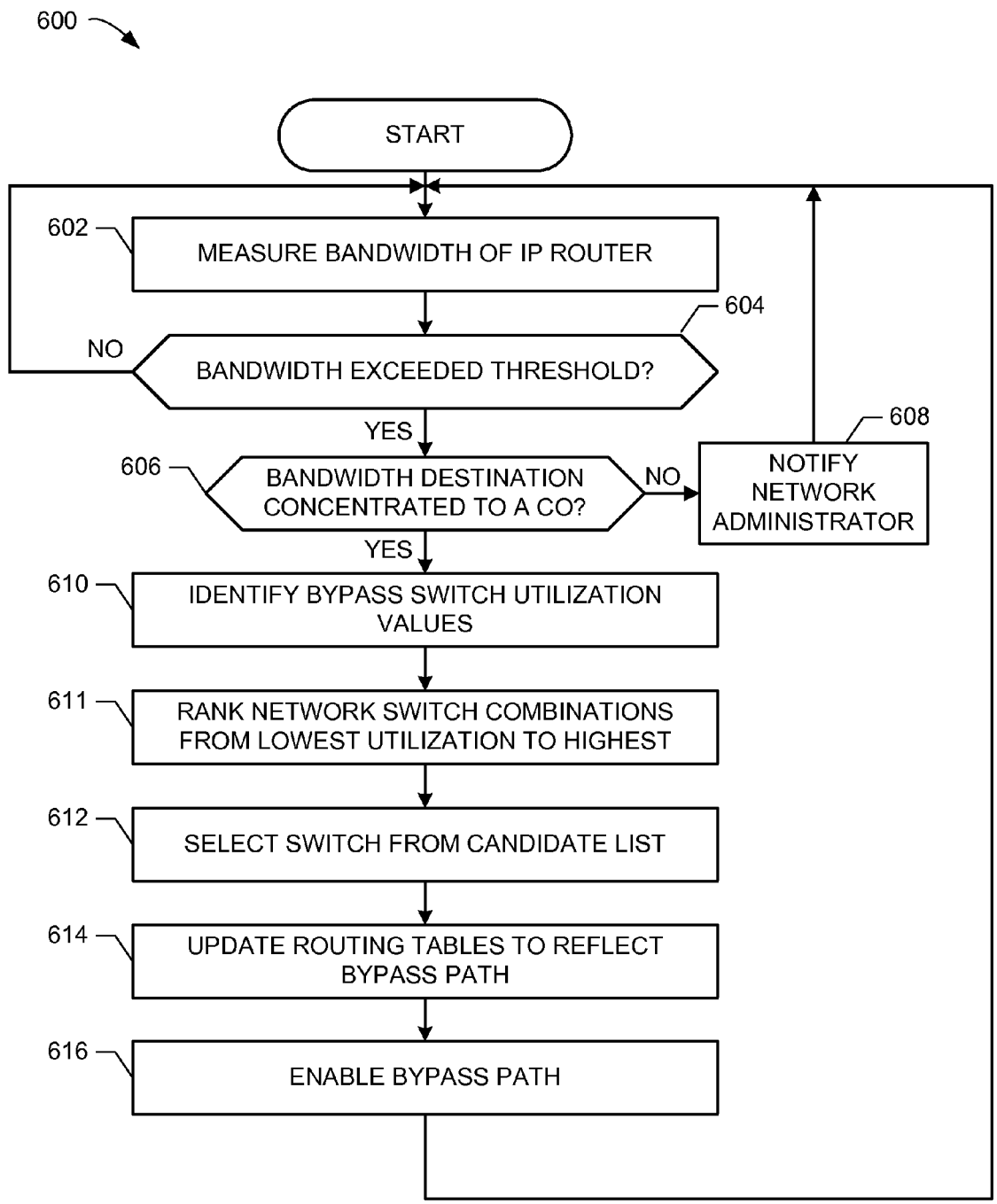

FIGS. 5A, 5B and 6 illustrate example processes that may be performed to implement the example methods and apparatus to manage bypass paths in an IP network of FIGS. 1-4. The example processes of FIGS. 5A, 5B and 6 may be carried out by a processor, a controller and/or any other suitable processing device. For example, the example processes of FIGS. 5A, 5B and 6 may be embodied in machine-readable or computer-readable coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium. Alternatively, some or all of the example processes of FIGS. 5 and 6 may be implemented using any combination(s) of ASIC(s), PLD(s), FPLD(s), discrete logic, hardware, firmware, etc. Also, one or more of the example processes of FIGS. 5A, 5B and 6 may instead be implemented manually or as any combination of any of the foregoing techniques, for example, any combination of firmware, software, discrete logic and/or hardware. Further, many other methods of implementing the example operations of FIGS. 5A, 5B and 6 may be employed. For example, the order of execution of the blocks may be changed, and/or one or more of the blocks described may be changed, eliminated, sub-divided, or combined. Additionally, any or all of the example processes of FIGS. 5A, 5B and 6 may be carried out sequentially and/or carried out in parallel by, for example, separate processing threads, processor, devices, discrete logic, circuits, etc.

The example process 500 of FIG. 5A generally includes setting up a path unit (blocks shown in 502) and discovering whether network switches are new or deleted from the IP network 100 (blocks shown in 504). The example process 500 begins by identifying an IP router in a CO that may be a candidate for a routerless bypass path (block 506). As described above, candidate COs may be determined based on one or more thresholds of network activity occurring at and/or through the CO. The methods and apparatus described herein to manage bypass paths in an IP network allow, in part, extending a useful life for IP routers within one or more COs by reducing network traffic burdens associated with Layer-3 routing devices. In other words, when a network traffic destination is known, protocols associated with packet routing may be replaced with point-to-point switching. Turning briefly to FIG. 5B, the example bandwidth monitor 202 selects a CO within the IP network 100 to determine whether it would be a suitable candidate for a routerless bypass path (block 550). Selection of the CO within the IP network 100 may occur in an ordered manner or be selected randomly. As described in further detail below, each CO within the IP network 100 may be selected and evaluated to determine whether it is a suitable candidate for a routerless bypass path. The example bandwidth monitor 202 measures and/or otherwise retrieves CO destination percentage values from the selected CO (block 552). For example, as described above in connection with FIG. 4, the example switch manager 210 may generate utilization information for each of the example COs within the example network 100 and generate a histogram and/or a table representative of router utilization. The example threshold manager 206 compares the received and/or measured CO destination percentage value with a threshold value retrieved from the example threshold database 208 (block 554). In the event that the threshold is exceeded (block 554), then the example switch manager 210 identifies the selected CO as a routerless bypass path candidate (block 556). However, if the threshold is not exceeded (block 554) and/or after the example switch manager 210 identifies the selected CO as a routerless bypass path candidate (block 556), the example bandwidth monitor 202 determines whether there are one or more additional COs to analyze (block 558). If so, control returns to block 550, otherwise control returns to FIG. 5A.

Returning to FIG. 5A, for COs that include one or more IP routers and were flagged as a candidate for a bypass path (block 556), a Layer-2 (or lower) switch, such as the network switch 112a of FIG. 1, may be deployed within the CO to facilitate point-to-point paths with one or more other switches within the example IP network 100 (block 508). While the illustrated example of FIG. 1 includes a path manager 106a-f in each of the corresponding COs 102a-f (e.g., distributed control), a centralized path manager (not shown) could be employed that is communicatively connected to each CO 102a-f. In other words, the example centralized path manager may operate via centralized control. A path manager may also be deployed within the CO to implement bypass paths in the IP network 100 (block 510). While the illustrated example path managers 106a-f of FIG. 1 are shown external to the network switches 112a-f, the path managers 106a-f may, instead, be embedded within the network switch, aggregation router, and/or the IP router. As described above, in one example, the combination of an IP router, a network switch, an aggregation router, and a path manager constitute a path unit within a CO.

Information related to path units added to one or more COs is added to the routing tables of the IP network (block 512), such as the example routing table 300 of FIG. 3. Each path manager 106a-f of the example IP network 100 may include a copy of the example routing table 300, and in the event of any changes to the routing table of one path manager, such changes may be propagated to the remaining COs of the IP network 100 on an automatic, periodic, aperiodic, manual and/or scheduled basis. Additionally, the example switch manager 210 of each path manager may measure the switch capacity and/or utilization values (e.g., in Gbit/s) and broadcast such information to other path managers within the IP network (block 514). In the event that the path managers 106a-f identify new or deleted network switches (block 516), the routing table is updated to reflect such changes (block 518). After a path unit is established 502 and/or after changes to a path unit are detected 504, the example process 500 determines whether new path units should be added (block 520). The addition of new path units may be initiated based on, for example, requests by a network administrator and/or an observation that one or more Layer-3 routers is nearing an operational capacity. However, if no additional path units are requested, then the example process 500 continues to monitor each path unit for changes (e.g., the addition of new switches, the deletion of existing switches, the utilization values for each switch, etc.) (block 520).

The example process 600 of FIG. 6 generally includes detecting conditions indicative of a need to initiate a routerless bypass path, and establish such bypass paths to reduce network traffic processing demands of corresponding Layer-3 network devices (e.g., the IP routers 110a-f). The example process 600 of FIG. 6 begins at block 602 with the example bandwidth monitor 202 measuring the example IP router 106 for an indication of utilization. Upon receiving an indication of utilization, such as a measurement value in units of bits-per-second (e.g., Mbits/s, Gbits/s, etc.), the example threshold manager 206 compares the received value against one or more thresholds that may be stored in the example threshold database 208. If no thresholds are exceeded (block 604), then the example process 600 continues to monitor bandwidth capacity for the IP router(s) 106 (block 602).

However, if the bandwidth monitor 202 determines that the IP router 106 is operating at a level in excess of the threshold (block 604), then the example destination monitor 204 determines whether the IP router is sending a threshold quantity of network traffic to a particular destination (block 606). In other words, the example destination monitor 204 determines whether the network traffic serviced by the IP router is concentrated to a particular destination. As described above, in the event that a Layer-3 device is becoming inundated with excessive network traffic, such as the IP router 110a of FIG. 1, then a routerless bypass path can have a beneficial effect on the IP router 110a when a substantial amount of network traffic can be offloaded from the IP router 110a as a result of the bypass path. In other words, if the bypass path only reduces network traffic burdens by a relatively small amount (e.g., less than 5% of the overall traffic handled by the IP router 110a), then the network administrator can likely achieve better network performance by adding another IP router to share the load of the inundated IP router 110a. In that case, if no single IP network destination can be identified as receiving a threshold quantity of network traffic (block 606), the destination monitor 204 may forward a notification message to the network administrator that another IP router may be necessary (block 608).

On the other hand, in the event that the example destination monitor 204 determines that the IP router 106 is directing a threshold quantity of network traffic to one or more particular destination nodes (e.g., one or more COs in the IP network 100) (block 606), then the example switch manager 210 identifies switch utilization values for one or more network switches operating in the IP network 100 (block 610). Switch utilization values identify, in part, which network switches within the example IP network 100 are already being utilized for routerless bypass paths, thereby providing one or more opportunities to select alternate paths that utilize switches that may be less utilized. As described above, each network switch in the example IP network 100 is measured to determine its utilization value (e.g., 65% utilized, utilization in MB/sec, etc.). The example threshold manager 206 compares the relative utilization values for each network switch and/or each combination of network switches to calculate a rank-ordered list of candidate network switches (block 611). Switches and/or combinations of network switches (e.g., an aggregate sum of network traffic for all switches in a candidate switch path) having the lowest utilization values are selected from a list of candidate network switches capable of facilitating the routerless bypass path (block 612). For example, if a routerless bypass path is to be created between CO-a and CO-e as shown in FIG. 1, then one candidate path may propagate from CO-a to CO-c, and finally to CO-e. However, an alternate candidate path may propagate from CO-a to CO-f, and finally to CO-e, in which the only difference between the two aforementioned candidate paths is whether a network switch associated with CO-c is used instead of a network switch associated with CO-f. As such, knowledge of the utilization values for each of CO-c and CO-f help identify a best-path for the routerless bypass path based on which of the two candidate paths is currently the least utilized.

The example routing table updater 214 updates all routing tables to reflect the selected routerless bypass path (block 614). After the new routerless bypass path is enabled by the example path manager 106 (block 616), control returns to block 602 to monitor the IP network 100 for one or more other COs that may benefit from the creation of a routerless bypass path.

Figure 7:
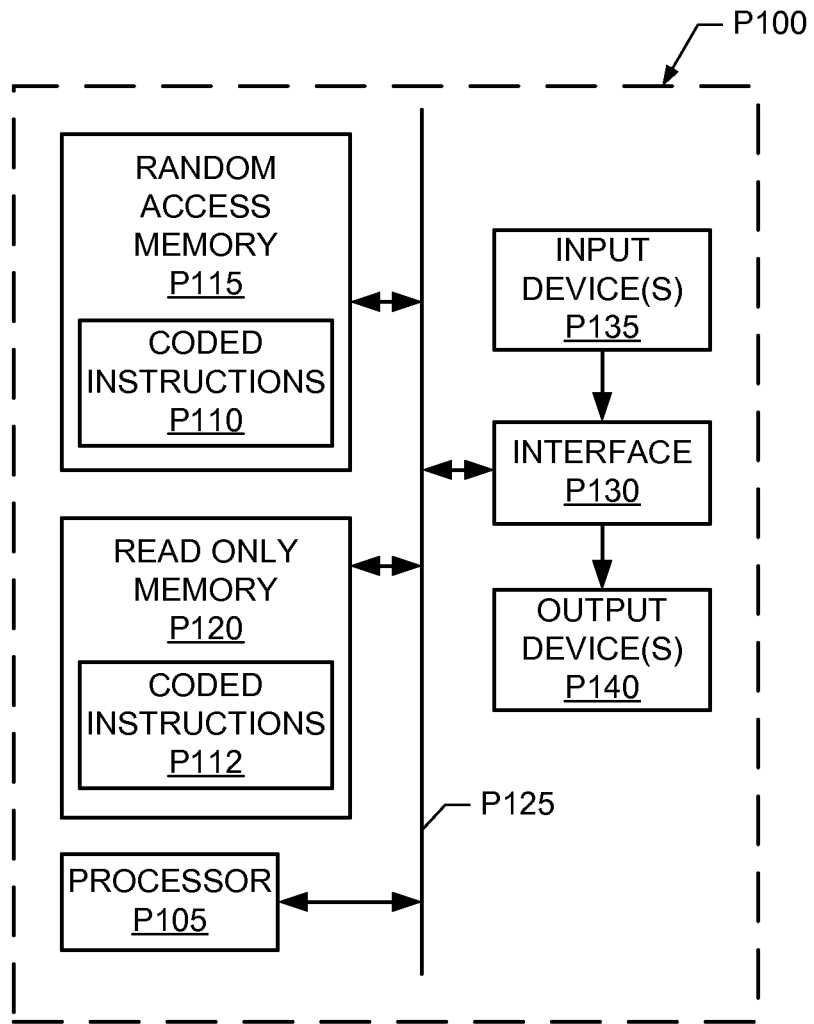
FIG. 7 is a block diagram of an example processing system that may execute the example processes of FIGS. 5 and 6 to implement the example IP network of FIG. 1 and/or the example path manager of FIGS. 1 and 2.

FIG. 7 is a schematic diagram of an example processor platform P100 that may be used and/or programmed to implement any or all of the example path units 104a-f, the example path managers 106a-f, the example aggregation routers 108a-f, the example IP routers 110a-f, the example network switches 112a-f, the example bandwidth monitor 202, the example destination monitor 204, the example threshold monitor 206, the example threshold database 208, the example switch manager 210 and/or the example switch database 212 of FIGS. 1 and 2. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (for example, within a RAM P115 and/or a ROM P120). The processor P105 may be any type of processing unit, such as a processor core, a processor and/or a microcontroller. The processor P105 may execute, among other things, the example processes of FIGS. 5A, 5B and 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer-implemented method to establish a new route in an Internet protocol network, comprising:
   identifying an aggregation router source bandwidth to a first Internet protocol router exceeding a source threshold value;
   identifying a first value of the aggregation router bandwidth directed to a first destination;
   identifying a second value of the aggregation router bandwidth directed to a plurality of second destinations; and
   bypassing the Internet protocol router with a Layer-2 Open systems Interconnection Reference device via a routerless bypass path when the first value of the aggregation router bandwidth exceeds a first threshold value.

2. A method as defined in claim 1, further comprising invoking a Layer-3 Open systems Interconnection Reference device via a router path when the second value of the aggregation router bandwidth exceeds a second threshold value.

3. A method as defined in claim 1, wherein the Layer-2 Open systems Interconnection Reference device facilitates point-to-point switching between the aggregation router and a destination network device.

4. A method as defined in claim 3, wherein the destination network device comprises at least one of a second Internet protocol router or a network switch.

5. A method as defined in claim 3, further comprising selecting the destination network device from a rank-ordered list of available network switches in the Internet protocol network.

6. A method as defined in claim 1, further comprising relinquishing the routerless bypass path when the aggregation router source bandwidth to the first Internet protocol router falls below the source threshold value.

7. A method as defined in claim 6, further comprising re-activating the first Internet protocol router to direct traffic to at least one of the first destination or the plurality of second destinations.

8. An apparatus comprising:
   a memory storing machine readable instructions; and
   a processor to execute the instruction to:
   identify an aggregation router source bandwidth to a first Internet protocol router exceeding a source threshold value;
   identify a first value of the aggregation router bandwidth directed to a first destination;
   identify a second value of the aggregation router bandwidth directed to a plurality of second destinations; and
   bypass the Internet protocol router with a Layer-2 Open systems Interconnection Reference device via a routerless bypass path when the first value of the aggregation router bandwidth exceeds a first threshold value.

9. An apparatus as defined in claim 8, further comprising a bandwidth monitor to invoke a Layer-3 Open systems Interconnection Reference device via a router path when the second value of the aggregation router bandwidth exceeds a second threshold value.

10. An apparatus as defined in claim 8, further comprising a path manager to facilitate point-to-point switching via the Layer-2 Open systems Interconnection Reference device between the aggregation router and a destination network device.

11. An apparatus as defined in claim 10, wherein the destination network device comprises at least one of a second Internet protocol router or a network switch.

12. An apparatus as defined in claim 10, further comprising a routing table updater to select the destination network device from a rank-ordered list of available network switches in the Internet protocol network.

13. An apparatus as defined in claim 8, further comprising a switch manager to relinquish the routerless bypass path when the aggregation router source bandwidth to the first Internet protocol router falls below the source threshold value.

14. An apparatus as defined in claim 13, further comprising a path manager to re-activate the first Internet protocol router to direct traffic to at least one of the first destination or the plurality of second destinations.

15. A tangible machine readable storage medium comprising instructions which, when executed, cause a machine to perform operations comprising:
   identifying an aggregation router source bandwidth to a first Internet protocol router exceeding a source threshold value;
   identifying a first value of the aggregation router bandwidth directed to a first destination;
   identifying a second value of the aggregation router bandwidth directed to a plurality of second destinations; and
   bypassing the Internet protocol router with a Layer-2 Open systems Interconnection Reference device via a routerless bypass path when the first value of the aggregation router bandwidth exceeds a first threshold value.

16. A tangible machine readable storage medium as defined in claim 15, wherein the instructions, when executed, cause the machine to invoke a Layer-3 Open systems Interconnection Reference device via a router path when the second value of the aggregation router bandwidth exceeds a second threshold value.

17. A tangible machine readable storage medium as defined in claim 15, wherein the instructions, when executed, cause the machine to facilitate point-to-point switching via the Layer-2 Open systems Interconnection Reference device between the aggregation router and a destination network device.

18. A tangible machine readable storage medium as defined in claim 17, wherein the instructions, when executed, cause the machine to select the destination network device from a rank-ordered list of available network switches in the Internet protocol network.

19. A tangible machine readable storage medium as defined in claim 15, wherein the instructions, when executed, cause the machine to relinquish the routerless bypass path when the aggregation router source bandwidth to the first Internet protocol router falls below the source threshold value.

20. A tangible machine readable storage medium as defined in claim 19, wherein the instructions, when executed, cause the machine to re-activate the first Internet protocol router to direct traffic to at least one of the first destination or the plurality of second destinations.

* * * * *